(12) United States Patent
Lerner

(10) Patent No.: US 8,512,793 B2
(45) Date of Patent: Aug. 20, 2013

(54) COMPOSITION AND METHOD FOR FLAVORING BREWED BEVERAGES

(75) Inventor: Howard Lerner, St. Louis, MO (US)

(73) Assignee: Inbru, LLC, Ellisville, MO (US)

( * ) Notice: Subject to any disclaimer, the term of this patent is extended or adjusted under 35 U.S.C. 154(b) by 230 days.

(21) Appl. No.: 13/004,735

(22) Filed: Jan. 11, 2011

(65) Prior Publication Data

US 2011/0217420 A1    Sep. 8, 2011

(51) Int. Cl.
*A23L 2/395*    (2006.01)

(52) U.S. Cl.
USPC ........... 426/590; 426/507; 426/594; 426/595; 426/650

(58) Field of Classification Search
USPC .......................... 426/590, 594, 595, 507, 650
See application file for complete search history.

(56) References Cited

U.S. PATENT DOCUMENTS

| | | | |
|---|---|---|---|
| 4,188,409 A * | 2/1980 | Kay | ................................ 426/78 |
| 5,043,172 A | 8/1991 | Loizzi | |
| 6,004,593 A | 12/1999 | Soughan | |
| 2005/0260326 A1 | 11/2005 | Kageyama et al. | |
| 2006/0029712 A1 * | 2/2006 | McPherson et al. | .......... 426/573 |
| 2007/0160736 A1 * | 7/2007 | Day | .............................. 426/595 |
| 2008/0075810 A1 | 3/2008 | Wen et al. | |
| 2009/0232950 A1 | 9/2009 | Brothers, Jr et al. | |
| 2012/0041081 A1 | 2/2012 | Hammond et al. | |

OTHER PUBLICATIONS

Co-pending PCT Application No. PCT/US2011/000043, filed Jan. 11, 2011.
International Search Report and Written Opinion from co-pending PCT Application No. PCT/US2011/000043, filed Jan. 11, 2011.

\* cited by examiner

*Primary Examiner* — Helen F Heggestad
(74) *Attorney, Agent, or Firm* — Don V. Kelly; Evans & Dixon, LLC

(57) ABSTRACT

A free-flowing cellulosic substrate, such as rice hulls, can be impregnated with desired liquid flavoring agents to create a free-flowing flavoring composition for brewed beverages such as coffee and tea. The flavoring composition can be added to ground roasted coffee or prepared tea leaves in a brew filter device such as a paper filter, French press, percolator, vacuum pot or any other mechanical filtering device intended to brew coffee or tea. The flavor-impregnated substrate will release the desired flavors in contact with water during the brew process, imparting flavor to the finished coffee or tea beverage.

25 Claims, No Drawings

COMPOSITION AND METHOD FOR FLAVORING BREWED BEVERAGES

CROSS REFERENCE TO RELATED APPLICATION

This application claims the benefit of U.S. Provisional Application No. 61/294,210 filed on Jan. 12, 2010. The entirety of that application is incorporated herein by reference.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF INVENTION

This invention relates generally to beverage flavoring systems, and more particularly to a process and composition for imparting desired flavors to brewed beverages during the brewing process.

BACKGROUND OF THE INVENTION

Coffee and tea are consumed in the United States and worldwide in increasing volume due to growth in population, popularity of coffee and tea beverages, and by the popularity of pairing various flavors with coffee and tea. Popular flavors include but are not limited to vanilla, hazelnut, cinnamon, fruit and berries, spices and herbs.

Traditionally, coffee roasters and tea packers infuse flavors into their products by means of liquid or powdered flavoring agents. These flavoring agents are applied to the coffee and tea prior to packaging and resale. Coffee beans can be flavored in whole bean form or in ground form, depending on the desire of the roaster and perceived consumer preferences. Tea packers can flavor prepared dry tea leaves or herbal blends (popularly known as herbal teas, but lacking *Camilla Sinensis* botanical, aka "tea"). The tea can be flavored in loose leaf form or in tea filter bags. Both flavored coffee and tea products can be intended for hot or cold consumption.

Flavoring of coffee and tea can also be accomplished during the brewing cycle. There exist flavoring agents that are placed into, and occasionally integrated with, paper coffee and tea filters. However, such methods have their shortcomings. Using the filter paper to absorb the flavoring agent for release during the brewing process involves significant expense in manufacturing such a "flavored filter." The proliferation of numerous sizes and shapes of commercial and home paper coffee and tea filters makes it impractical to manufacture a flavored filter to accommodate all potential brewing circumstances. Furthermore, many coffee and tea filters are not made of paper and are designed to be re-used. Therefore, flavored filters may not be applicable to those situations.

Flavored inserts tend to be of a uniform size and do not readily present consistent flavoring quality for the wide variety of brew batch sizes that can range from a single 4.8 ounce serving for home applications to tens of gallons in commercial applications. This renders the flavored insert impractical from a production perspective and unattractive for the end user because of the uncertainty in delivering a consistent flavoring over different brew and serving sizes.

A flavored insert also fails to address the challenge of dispersal of flavor given a specific brew time and volume of brew water. The physical form of a flavored insert restricts the flavoring agent's ability to disperse throughout the brew basket and saturate sufficiently to release flavor. To compensate for this challenge, the flavored insert must contain significantly more flavoring agent or a flavoring agent in a significantly higher concentration. This drives up the price in manufacturing a flavored insert, making it less appealing to the end user.

Brewable food products include ground coffee and cut tea. The products may be sold in loose form or in specific serving size pouches (e.g., a tea bag or fractional package). Coffee roasters and tea packers typically select a specific profile of coffee or tea based on price, quality, availability or taste as a "base" upon which to apply a flavoring agent. The end user of packed brewable food products is typically a retailer that sells cups of brewed flavored beverages such as coffee and tea or a consumer who brews the beverage for personal consumption. Whatever the situation, the end user is limited to the pre-flavored coffee or tea foundation selected by the coffee roaster or tea packer. Cafe operators and specialty coffee/tea retailers such as restaurateurs, grocers, and cafe owners wishing to provide a flavored coffee/tea selection must purchase a dedicated inventory of perishable coffee or tea. The cash-flow consequences of carrying a large and perishable pre-flavored inventory make it prohibitive or unattractive for many retailers to satisfy the flavored coffee and tea demands of consumers. Similarly, consumers wishing to purchase flavored coffee and tea for home consumption must purchase a specifically flavored coffee and tea product. The ability to have on hand a variety of flavored coffee/tea products is limited to those who can afford and reasonably consume numerous packages of various flavored coffees and teas.

Flavoring may also be added to coffee and tea after it has brewed. While liquid flavorings (i.e., flavoring agents in liquid form) are currently available for coffee and tea drinkers, they typically contain sweeteners. Regular consumers of flavored coffee and tea may prefer their products free from sweeteners. Likewise, flavored creamers or whiteners are available, but do not satisfy consumers who prefer to enjoy their coffee and tea without a whitener or creamer. Furthermore, attempts at using non-sweetened, non-whitening flavoring agents applied to the prepared, liquid coffee or tea are typically unsatisfying due to an inability to properly mix the hot beverage and the difficulty of measuring liquids into an individual cup or serving vessel. It is difficult and dangerous to shake hot liquids and stirring does not sufficiently incorporate the flavor into the coffee or tea beverage.

Consumers desiring a flavored coffee or tea beverage would thus benefit from the choices allowed if flavoring were performed at the time of brewing rather than the time of packaging. It is therefore desirable to provide a flavoring agent that can be utilized during the brewing process to impart flavor to a beverage made from a brewable food product. It is further desirable to provide a flavoring agent that is broadly applicable in flavoring brewed beverages, such as coffee and tea, under any brewing method. It is further desirable to provide a flavoring agent that is simple for the brewer or user to employ in flavoring any size batch of brewed beverage to a consistent flavoring quality. With particular regard to coffee, it is further desirable to provide a flavoring agent that does not need to be integrated directly into the whole coffee bean.

SUMMARY OF THE INVENTION

One embodiment of the invention comprises a flavoring agent composition for flavoring brewed beverages, such as coffee and tea, during the brewing process. The flavoring composition comprises a cellulosic substrate bearing a water-soluble flavoring agent and is in the form of free-flowing granules or flakes. In a preferred embodiment, the cellulosic substrate is also in the form of free-flowing granules or flakes. In this embodiment, the free-flowing granules or flakes are coated or impregnated with one or more liquid flavoring agents that are allowed to dry on the granules or flakes. The preferred free-flowing cellulosic substrate is rice hulls. The resulting physical form of the flavoring agent composition enables it to be measured out as necessary to flavor any volume of brewed coffee desired.

The flavoring agent composition can be packaged to provide the end user with easy-to-follow directions, or pre-calibrated measuring scoops, to ensure that a consistent flavoring is imparted to whatever amount of coffee is desired to be brewed. The rice hulls absorb and, in dry form, hold various preselected flavoring agents. The resulting composition is a dry-to-the touch, coarse granular material that is flowable (free-flowing). The flavored granules are sufficiently small in particle size to permit measurement with standard and metric volumetric calibrations, yet are not small enough to pass through conventional brewing filter systems. In contrast to current conventional flavoring processes, the present invention flavoring composition meets the needs in the art by economically allowing coffee shops and consumers to select from a large variety of flavored coffees and teas. Consumers and retailers would benefit both by having access to a variety of coffees and teas and through the financial savings of being able to purchase the specific coffee or tea they desire and the flavors that appeal to them as separate and distinct products purchases.

The present invention also includes a method of preparing the inventive flavoring composition along with a method of brewing a beverage using the inventive flavoring composition. The flavoring agent composition is placed in the filter brew chamber and becomes mixed with the brewable food product (e.g., ground coffee or tea) during the brewing process. Preferred embodiment beverages brewed by using the inventive composition include coffee and tea. The rice hulls are neutral in flavor relative to the strength of the liquid flavoring agent selected and to the coffee or tea with which it will be brewed. The rice hulls release flavor imparted from the liquid agent as the beverage is brewed, and provide a uniform, predictable and consistent flavor.

The present invention further includes a brewable coffee product including ground roasted coffee and the described flavoring composition. The composition comprises a cellulosic substrate bearing a water-soluble flavoring agent and is in the form of free-flowing granules or flakes. The present invention further includes a brewable tea product including cut tea and the described flavoring composition. The composition comprises a cellulosic substrate bearing a water-soluble flavoring agent and is in the form of free-flowing granules or flakes. The present invention further includes a beverage brewed using the inventive flavoring composition described herein.

DETAILED DESCRIPTION OF THE INVENTION

The flavoring agent composition of the present invention comprises a cellulosic substrate bearing a water-soluble flavoring agent, the composition being in the form of free-flowing granules or flakes. The water-soluble flavoring agent is applied as a liquid to the cellulosic substrate. The applied liquid flavoring is allowed to dry on the substrate. As used herein, the term "liquid flavoring agent" includes a conventional single flavor liquid agent and also a liquid containing one or more flavored liquids. The preferred embodiment of the invention comprises rice hulls (themselves being free-flowing granules or flakes) as the cellulosic substrate of the flavoring agent composition. Rice hulls adsorb and absorb flavors well and thus can be coated or impregnated with liquid flavoring agents. In addition, rice hulls are neutral in flavor, do not significantly degrade when subjected to hot water immersion such as is encountered during a brewing cycle. In this respect, the rice hulls maintain their solid structure and do not break apart or become flaccid or gummy. Rice hulls also do not have the allergy concerns such as are associated with wheat products. The rice hulls readily release the imparted flavors in the presence of heat, moisture and gentle agitation such as that experienced in a coffee/tea brew basket. Rice hulls also present a significant amount of surface area on which to infuse the flavor thereby making the absorption and release of flavor more efficient. The rice hulls used for purposes of the invention are cut to the consistency of loose tea ("tea bag cut"). A representative type of rice hull is provided by RIBUS, Inc. under the trademark Nu-FLAC, with the optimum size hull being referred to by RIBUS as "tea cut." When sized in this fashion the resulting preferred embodiment flavoring composition is a coarse flowable material that readily imparts flavor during brewing, but is too large to sift through typical coffee brewing filters. The texture of the preferred embodiment composition is akin to light granules or flakes.

In making the preferred embodiment flavoring composition, the substrate of free-flowing rice hulls is coated or impregnated with a liquid flavoring composition of a type generally provided in the industry. Such liquid flavoring agents may be natural or artificially created. Typical available flavors include, for example, vanilla, hazelnut, cinnamon hazelnut, toasted chestnut, highlander grogg, pumpkin pie, macadamia nut, chocolate fudge, peppermint and Danish pastry to name a few. One such company that provides liquid flavoring compositions is Firmenich, Inc. These liquid flavors typically are highly concentrated and are relatively consistent throughout the flavoring industry. They are also water soluble so that they readily release from the cellulosic substrate during the brewing cycle. The liquid flavoring may be present in the flavoring composition in any amount deemed effective to impart satisfactory flavoring to the brewed liquid. The liquid flavoring amount will vary based upon the beverage being brewed and consumer tastes.

The present invention further includes a method of making a flavoring composition that can be used to flavor brewable food products during the brewing process. Traditional methods of flavoring whole bean coffee generally apply three percent (3%) by weight of liquid flavoring to the batch of roasted whole bean coffee that is flavored. For example, a pound (which is 453,592 grams) of conventionally flavored coffee is prepared by mixing 13.607 g of liquid flavor with 439,985 g of roasted whole bean coffee. In comparison, one embodiment of the present invention flavoring composition for making French vanilla flavored coffee applies 14.0% by weight liquid flavoring agent to 86.0% by weight rice hull substrate. The most desirable flavoring compositions are made by blending at least 6% by weight liquid flavoring agent with tea bag cut rice hulls. More preferably, the flavoring compositions are made by mixing between about 6% by weight and 18% by weight liquid flavoring agent with tea bag cut rice hulls.

Generally speaking, the flavoring composition is prepared by mixing the cellulosic substrate with the flavoring agent. The mixed materials are allowed to dry to the touch so as to form dry (to the touch), coarse free-flowing granules or flakes. In one embodiment of preparing the beverage flavoring composition of the present invention, 14% by weight liquid flavoring agent is mixed with 86% by weight rice hull substrate in a mechanical mixer, such as a drum/bucket roller, drum/bucket tumbler, ribbon blender, vertical blender or any other method suitable to achieve thorough and satisfactory mixing of the product ingredients. The large surface area presented by the cut rice hulls enables a thorough coating of liquid flavoring agent so that the release of flavor during the brewing process may be maximized. Ideally, the product is prepared in a well-ventilated, clean room having ambient temperature of between 60-80° F. The wet product is vigorously agitated and allowed to sit and dry for at least 5 hours. After the product dries to the touch, it can then be packaged for distribution. The product may be packaged by means generally known in the industry. The product should be kept dry and in a sealed container to retain the flavor.

The following examples are provided to illustrate the invention, but should not be construed as limiting in scope.

Example 1

A hazelnut coffee flavoring composition was formulated as follows:

| Ingredient | Weight % |
| --- | --- |
| Ribus tea cut rice hulls | 83 |
| Firmenich hazelnut liquid flavoring | 17 |

1700 grams of liquid flavoring was added to 8300 grams of RIBUS tea cut rice hulls in a well-ventilated, clean room having an ambient temperature of between 60-80° F. The foregoing ingredients were combined in a drum tumbler and mixed for 1.5 hours. The wet product was then allowed to sit and dry for at least 5 hours. After the product dried, it was then packaged for distribution.

Example 2

A vanilla coffee flavoring composition was formulated as follows:

| Ingredient | Weight % |
| --- | --- |
| Ribus tea cut rice hulls | 86 |
| Firmenich vanilla liquid flavoring | 14 |

1400 grams of liquid flavoring was added to 8600 grams of RIBUS tea cut rice hulls in a well-ventilated, clean room having an ambient temperature of between 60-80° F. The foregoing ingredients were combined in a drum tumbler and mixed for 1.5 hours. The wet, mixed product was then allowed to sit and dry for at least 5 hours. After the product dried, it was then packaged for distribution.

Brewed coffee and tea can be flavored to a desirable and consistent level using the flavoring composition of the present invention. Because of the large surface area presented by the rice hull substrate in absorbing and releasing flavor, brewed coffee and tea can be efficiently flavored during the brewing process. Flavoring of coffee and tea can be achieved to a predictable level by the user, whether brewed at retail or brewed at home. The readily flowable nature of the rice hulls permit easy measuring of the flavoring composition by the end user to further promote consistent flavoring for brewed batches of beverage.

The present invention is further directed to a brewable coffee product that comprises ground roasted coffee and the described flavoring composition comprising a cellulosic substrate and a liquid flavoring agent. The present invention further includes a brewable tea product that comprises cut tea and the described flavoring composition comprising a cellulosic substrate and a liquid flavoring agent. The present invention further includes a beverage brewed using the inventive flavoring composition described herein. Such a method would comprise providing the inventive flavoring composition in any of the forms as herein described along with a brewable food product (e.g., ground coffee or cut tea) and water. The flavoring composition is combined with the brewable food product to form a mixture. Then water is added to the mixture. Optionally, in the case of drinks like sun tea, the flavoring composition could be added after the water has been added to the brewable food product.

Measuring spoons or scoops may be packaged with the flavoring composition to enable the end user to apply consistent amounts of flavoring to the brew filter chamber to take any guesswork out of the preparation process in achieving a desired level of flavoring. Furthermore, because of its flowable, and thus measurable, quality the end user will be able to easily determine an appropriate amount of flavoring composition to use to consistently achieve different desired flavor concentration levels of the brewed batch of beverage.

Home users sometimes brew one cup of coffee or tea. Sometimes they brew an entire pot. A flavoring technology with a simple and predictable measuring technique allows consumers to achieve satisfactory results in the volume desired. Commercial resellers of prepared flavored coffee and tea must be able to quickly and accurately flavor their product and meet the consistency and quality demands of their customers. A simple and intuitive technique of quickly measuring the flavoring agent is essential to the consistent result required by retailers. A simple guide and illustration makes it possible for both home and commercial users to prepare flavored coffees and teas at the time of brewing. Brewed quantities of coffee can vary tremendously. To help users quickly determine the proper amount of flavoring composition to use, colored scoops calibrated to a particular brew volume can be provided. While each scoop corresponds to a volumetric dose of flavoring, the color of the scoop is significant because various levels of education, time constraints and operator error can influence the success of the flavoring process. Scoops are available in specific colors to ensure proper measurement of product. The volume of the scoop is embossed on the body of the scoop for reference. Pre-measured pouches for consumers who brew the same batch size or desire a specific volume of flavoring product may also be available. This option eliminates the need for a scoop. Simply tear open the pouch and add to the coffee or tea brew chamber and brew as directed.

Thus, it is seen that the invention provides a brewed beverage flavoring composition having excellent properties. The brewed beverage flavoring composition may be prepared in accordance with the teachings herein. The flavoring composition is a coarse, but flowable granular or flake product that can impart flavor to brewed beverages during the brewing cycle without sifting through conventional brew filter systems.

While particular embodiments of the invention have been shown, it will be understood that the invention is not limited thereto as modifications may be made by those skilled in the

What is claimed is:

1. A composition for flavoring brewed beverages during the beverage brewing process, the composition comprising rice hulls bearing a water-soluble flavoring agent and being in the form of free-flowing granules or flakes.

2. The flavoring composition of claim 1 wherein the rice hulls are tea bag cut.

3. The flavoring composition of claim 2 wherein the composition is prepared by mixing the rice hulls with a liquid flavoring agent and the liquid flavoring agent constitutes at least 6% by weight of the mixture.

4. The flavoring composition of claim 2 wherein the composition is prepared by mixing the rice hulls with a liquid flavoring agent and the liquid flavoring agent constitutes between about 6% and about 18% by weight of the mixture.

5. A method of brewing a beverage, the method comprising: providing the flavoring composition of claim 1, a brewable food product and water; combining the flavoring composition with the brewable food product to form a mixture; and adding the water to the mixture.

6. A method of brewing a beverage, the method comprising: providing the flavoring composition of claim 2, a brewable food product and water; combining the flavoring composition with the brewable food product to form a mixture; and adding the water to the mixture.

7. A method of brewing a beverage, the method comprising: providing the flavoring composition of claim 3, a brewable food product and water; combining the flavoring composition with the brewable food product to form a mixture; and adding the water to the mixture.

8. A method of brewing a beverage, the method comprising: providing the flavoring composition of claim 4, a brewable food product and water; combining the flavoring composition with the brewable food product to form a mixture; and adding the water to the mixture.

9. A method of manufacturing a flavoring composition for brewed beverages, the method comprising: providing a substrate of rice hulls and a liquid flavoring agent; mixing the substrate of rice hulls and the liquid flavoring agent to form a mixture in which the substrate of rice hulls is coated or impregnated with the liquid flavoring agent; and drying the coated or impregnated substrate of rice hulls so that it is dry to the touch.

10. The method of claim 9 wherein the rice hulls are tea bag cut.

11. The method of claim 10 wherein the liquid flavoring agent is mixed with the substrate of rice hulls in an amount of at least 6% by weight of the mixture.

12. The method of claim 10 wherein the flavoring agent is mixed with the substrate of rice hulls in an amount between about 6% to about 18% of the mixture.

13. A brewable coffee product comprising: ground roasted coffee; and a flavoring composition comprising a substrate of rice hulls bearing a water-soluble flavoring agent and being in the form of free-flowing granules or flakes.

14. The brewable coffee product of claim 13 wherein the substrate of rice hulls is in the form of free-flowing granules or flakes.

15. The brewable coffee product of claim 14 wherein the rice hulls are tea bag cut.

16. The brewable coffee product of claim 15 wherein the composition is prepared by mixing the rice hulls with a liquid flavoring agent and the flavoring agent constitutes at least 6% by weight of the mixture.

17. The brewable coffee product of claim 15 wherein the composition is prepared by mixing the rice hulls with a liquid flavoring agent and the flavoring agent constitutes between about 6% by weight and about 18% by weight of the mixture.

18. A brewable tea product comprising: cut tea leaves; and a flavoring composition comprising a substrate of rice hulls bearing a water-soluble flavoring agent and being in the form of free-flowing granules or flakes.

19. The brewable tea product of claim 18 wherein the rice hulls are tea bag cut.

20. The brewable tea product of claim 19 the composition is prepared by mixing the rice hulls with a liquid flavoring agent and the flavoring agent constitutes at least 6% by weight of the mixture.

21. The brewable tea product of claim 19 wherein the composition is prepared by mixing the rice hulls with a liquid flavoring agent and the flavoring agent constitutes between about 6% by weight and about 18% by weight of the mixture.

22. A brewed beverage produced by the process comprising: providing the flavoring composition of claim 1, a brewable food product and water; combining the flavoring composition with the brewable food product to form a mixture; and adding the water to the mixture.

23. The brewed beverage of claim 22 wherein the rice hulls are tea bag cut.

24. The brewed beverage of claim 23 wherein the composition is prepared by mixing the rice hulls with a liquid flavoring agent and the liquid flavoring agent constitutes at least 6% by weight of the mixture.

25. The brewed beverage of claim 23 wherein the composition is prepared by mixing the rice hulls with a liquid flavoring agent and the liquid flavoring agent constitutes between about 6% by weight and about 18% by weight of the mixture.

* * * * *